United States Patent

Nomura et al.

Patent Number: 6,034,827
Date of Patent: Mar. 7, 2000

[54] OPTICAL LENS

[75] Inventors: Yoshimitsu Nomura; Masaaki Fukuda; Takashi Ito; Kaneyoshi Yagi, all of Saitama, Japan

[73] Assignee: Fuji Photo Optical Co., Ltd., Saitama, Japan

[21] Appl. No.: 09/122,626

[22] Filed: Jul. 27, 1998

[30] Foreign Application Priority Data

Sep. 25, 1997 [JP] Japan ................................. 9-260178

[51] Int. Cl.[7] .................................................. G02B 7/02
[52] U.S. Cl. ................................. 359/811; 359/719
[58] Field of Search .................... 351/159–177; 359/718, 719, 796, 819–820, 808, 811; 623/6; 264/328.1, 297.2

[56] References Cited

U.S. PATENT DOCUMENTS

| 4,249,271 | 2/1981 | Poler | 623/6 |
|---|---|---|---|
| 4,254,065 | 3/1981 | Ratkowski | 264/2.5 |
| 4,332,443 | 6/1982 | Thomas | 351/160 H |
| 4,562,600 | 1/1986 | Ginsberg et al. | 623/6 |
| 4,799,793 | 1/1989 | Feinbloom | 356/127 |
| 5,192,319 | 3/1993 | Worst | 623/6 |
| 5,347,326 | 9/1994 | Volk | 351/160 R |
| 5,776,191 | 7/1998 | Mazzocco | 623/6 |
| 5,781,351 | 7/1998 | Murakami et al. | 359/808 |
| 5,838,496 | 11/1998 | Maruyama et al. | 359/565 |

*Primary Examiner*—Georgia Epps
*Assistant Examiner*—Jordan M. Schwartz
*Attorney, Agent, or Firm*—Leydig, Voit & Mayer, Ltd.

[57] ABSTRACT

Provided is an optical lens which can reduce and easily adjust astigmatism. The optical lens has a flange at an outer periphery of an optically functioning portion. The flange has smaller-diameter sections recessed inward from its outer peripheral portion. The smaller-diameter sections are located at positions symmetrical to each other about an optical axis of the optically functioning portion.

5 Claims, 3 Drawing Sheets

OPTICAL LENS

BACKGROUND OF THE INVENTION

1. Field of the Invention

The present invention relates to an optical lens and, in particular, to an optical lens which can be manufactured with its astigmatism arbitrarily adjusted.

2. Related Background Art

As shown in FIG. 4, conventionally known is an optical lens A in which a flange C is formed at the outer periphery of an optically functioning portion B. The flange C is mainly used for attaching the optical lens A to a holder or the like. The flange C, which is disposed around the optically functioning portion B functioning as a lens, is formed with a constant thickness at the outer periphery of the optically functioning portion B. The optical lens A is manufactured by injection molding of a resin, for example.

SUMMARY OF THE INVENTION

Such an optical lens A has shortcomings in that it is likely to yield astigmatism upon manufacture. For example, as shown in FIG. 5, when the optical lens A is manufactured by injection molding, a resin is injected into a mold D, pressed therein, kept at a predetermined pressure, then cooled, and released from the mold, whereby the optical lens A is obtained as a molded article. Upon molding, a gate E, which is a resin-injecting port, is positioned at an outer peripheral portion of the optical lens A, a holding pressure F from the gate E acts within the optical lens A. As a consequence, within the optical lens A, the pressure $P_1$ in the resin-injecting direction (longitudinal direction in FIG. 5) would differ from the pressure $P_2$ in the direction perpendicular thereto (lateral direction in FIG. 5). Due to such a difference between the pressures $P_1$ and $P_2$ the amount of distortion within thus molded optical lens A would vary depending on directions, thereby yielding astigmatism. In order to reduce astigmatism caused by inner distortion of the optical lens A, it is necessary to finely adjust a molding condition such as mold temperature, injection pressure, injection speed, resin temperature, or the like. Therefore, in the manufacture of the optical lens A, it is quite difficult to reduce astigmatism.

In order to overcome the foregoing problems, it is an object of the present invention to provide an optical lens which can reduce and easily adjust astigmatism.

The optical lens in accordance with the present invention comprises an optically functioning portion having an optical function; and a flange, formed at an outer periphery of the optically functioning portion, having a plurality of smaller-diameter sections recessed at an outer peripheral portion of the flange, the smaller-diameter sections being formed at positions symmetrical to each other about an optical axis of the optically functioning portion.

The optical lens in accordance with the present invention may be manufactured by injection molding of a resin.

The optical lens in accordance with the present invention may be manufactured by injecting a resin from a position corresponding to the outer peripheral portion of the flange other than the smaller-diameter sections.

The optical lens in accordance with the present invention may be manufactured by injecting a resin from a position corresponding to a smaller-diameter section of the flange.

In accordance with the present invention, as smaller-diameter sections are formed at symmetrical positions in the flange, when the optical lens is being molded, the amount of shrinkage would differ between the direction connecting the smaller-diameter sections and the direction orthogonal thereto. This direction-dependent difference in amount of shrinkage can be utilized to generate astigmatism. As the area formed with the smaller-diameter sections, their diameter, or the like is appropriately adjusted, the amount of astigmatism of the optical lens can be suitably regulated.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DETAILED DESCRIPTION OF THE PREFERRED EMBODIMENTS

Figure 1:
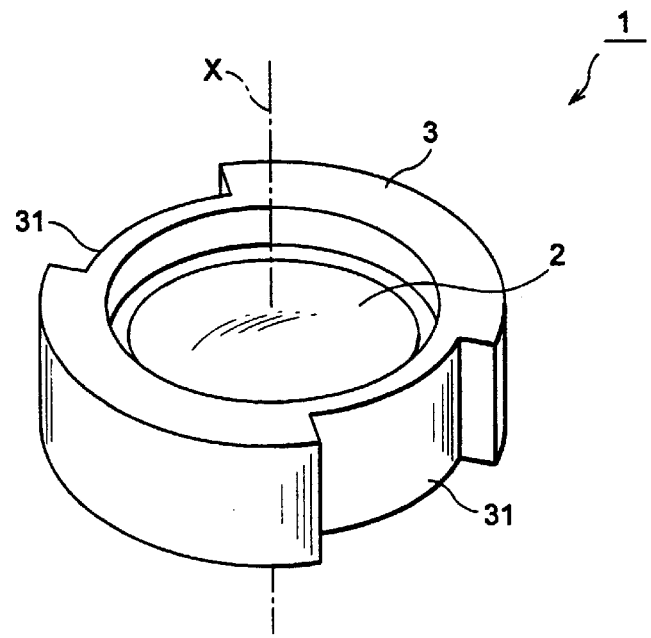
FIG. 1 is a perspective view of the optical lens in accordance with a first embodiment.

In the following, various embodiments of the present invention will be explained with reference to the accompanying drawings. Among the drawings, constituents identical to each other will be referred to with numerals or letters identical to each other without their overlapping explanations repeated. Also, ratios of sizes in the drawings do not always coincide with those explained.

First Embodiment

Figure 2:
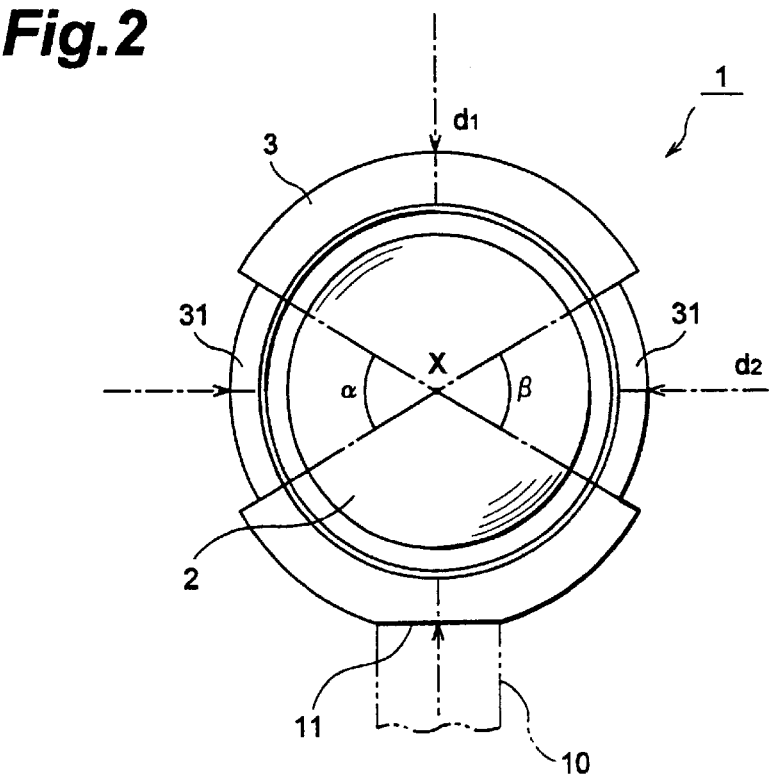
FIG. 2 is an explanatory view of the optical lens in accordance with the first embodiment.

FIG. 1 is a perspective view of an optical lens in accordance with the first embodiment. FIG. 2 is a plan view of the optical lens in accordance with this embodiment. As shown in FIG. 1, an optical lens 1, which is a lens having a diameter on the order of several mm used for an objective lens of an optical pickup for a CD-ROM drive or the like, has an optically functioning portion 2 functioning as a convex lens at its center. A flange 3 is disposed at an outer peripheral part of the optically functioning portion 2. The flange 3, which becomes an attachment when the optical lens 1 is attached to a holder or the like, has an annular shape and is formed at the whole periphery of the optically functioning portion 2. The flange 3 is integrally formed by a material identical to that of the optically functioning portion 2, e.g., a plastic.

As a material for constituting the optically functioning portion 2 and the flange 3, those having a molding shrinkage characteristic (characteristic of shrinking at a cooling step upon molding) can be employed. Specifically, PMMA (polymethyl methacrylate), PC (polycarbonate), epoxy resin, PS (polystyrene), MS resin (methyl methacrylate/styrene copolymer), AS resin (acrylonitrile/styrene copolymer), or the like may be employed.

As shown in FIG. 1, the outer peripheral portion of the flange 3 is provided with smaller-diameter sections 31, 31 having an outer diameter smaller than the other part. As the outer peripheral portion of the flange 3 is partly recessed inward, the outer diameter of the optical lens 1 is partly reduced, thereby yielding the smaller-diameter sections 31, 31. As the smaller-diameter sections 31 are formed, the amount of shrinkage can be varied among diametrical directions of the optical lens 1 upon molding thereof. The smaller-diameter sections 31, 31 are formed at positions symmetrical to each other about the optical axis X of the optically functioning portion 2. For example, as shown in FIG. 2, assuming that the direction connecting a cut section 11 of a gate 10 and the optical axis X is "gate direction" and that the direction orthogonal thereto is "gate-perpendicular direction," the smaller-diameter sections 31, 31 are formed at positions distanced from the optical axis X in the gate-perpendicular direction.

As shown in FIG. 2, assuming that angles each formed between two lines respectively connecting the optical axis X to both end portions of the individual smaller-diameter section 31 are $\alpha$ and $\beta$, the smaller-diameter sections 31, 31 are preferably formed at areas where each angle $\alpha$, $\beta$ becomes 60°. Also, as shown in FIG. 2, assuming that the outer diameters of the optical lens 1 in the gate direction and gate-perpendicular direction are respectively $d_1$, and $d_2$, the outer diameter $d_2$ concerning the smaller-diameter sections 31 is preferably about 75% to 95% of the outer diameter $d_1$, for example. Nevertheless, the areas formed with the smaller-diameter sections 31 and the outer diameter concerning the smaller-diameter sections 31 are not restricted to the above-mentioned areas and outer diameter $d_2$, but can be appropriately set according to the astigmatism to be generated in the optical lens 1 or the like.

Not only two but more smaller-diameter sections 31 may be formed as well. Also, the forms of the smaller-diameter sections 31 disposed at symmetrical positions may not be identical to each other.

A method of making the optical lens 1 will now be explained.

In FIG. 2, the optical lens 1 is manufactured by molding of a resin. For example, a mold having a cavity formed identical to the outer shape of the optical lens 1 is prepared, a resin is injected into the cavity through the gate 10, the resin is held at a predetermined pressure after filling the cavity, and then the resin is cooled and released from the mold, whereby the optical lens 1 made of a plastic is obtained as a molded article. Upon this manufacture by molding, when a holding pressure is applied after the resin injection, as the resin lowers its fluidity, the pressure is applied greater in the gate direction (direction of the outer diameter $d_1$, i.e., longitudinal direction in FIG. 2) and smaller in the gate-perpendicular direction (direction of the outer diameter $d_2$, i.e., lateral direction in FIG. 2) within the optical lens 1. When the resin is cooled while receiving such a holding pressure, the amount of distortion within the optical lens 1 being formed becomes greater in the gate direction than in the gate-perpendicular direction, whereby astigmatism would be generated in the optical lens 1 due to such a difference in the inner distortion.

Meanwhile, the resin shrinks when being cooled to yield the optical lens 1. On the other hand, the optical lens 1 is configured such that the outer diameter $d_1$ in the gate direction is greater than the outer diameter $d_2$ in the gate-perpendicular direction. As a consequence, when the resin shrinks upon cooling, the amount of shrinkage would increase in the gate direction by an amount corresponding to the length by which the size in the gate direction is greater than that in the gate-perpendicular direction. As a result, when taking two cross sections of the optically functioning portion 2 respectively along the outer diameter $d_1$ in the gate direction and the outer diameter $d_2$ in the gate-perpendicular direction in FIG. 2, the radius of curvature in the surface of the optically functioning portion 2 in the cross section along the gate direction is greater than the radius of curvature in the surface of the optically functioning portion 2 in the cross section along the gate-perpendicular direction. Consequently, the optical lens 1 yields astigmatism.

In this case, while astigmatism is generated in response to deformation of the optical lens 1 upon shrinkage since the outer peripheral portion of the flange 3 in the optical lens 1 is provided with smaller-diameter sections 31, 31, this astigmatism occurs in the direction negating the astigmatism caused by the inner distortion upon holding pressure or the like, thus canceling the astigmatism caused by the inner distortion. Consequently, the overall astigmatism in the optical lens 1 can be reduced.

As explained above, in the optical lens 1 in accordance with this embodiment, as the smaller-diameter sections 31, 31 are formed at symmetrical positions in the flange 3, the difference in amount of shrinkage between the gate-perpendicular direction connecting the smaller-diameter sections 31, 31 and the gate direction orthogonal thereto can be utilized to generate astigmatism in the optical lens 1 upon molding thereof. As the area formed with the smaller-diameter sections 31, their diameter, or the like is appropriately set, the resulting astigmatism of the optical lens 1 can be arbitrarily increased or decreased. Accordingly, in the case where astigmatism occurs due to inner distortion in the optical lens 1, when the smaller-diameter sections 31, 31 are formed so as to generate astigmatism negating the astigmatism caused by inner distortion, the overall astigmatism of the optical lens 1 can be reduced.

Even in the case where no astigmatism occurs due to inner distortion in the optical lens 1 or such astigmatism caused by the inner distortion is not problematic in terms of optical performance, characteristics of an optical system incorporating the optical lens 1 can be enhanced by arbitrarily generating astigmatism. For example, in the case where light incident on the optical lens 1 has an elliptical luminous flux cross section, the smaller-diameter sections 31, 31 can be formed to generate astigmatism in the optical lens 1 such as to change the luminous flux cross section of the light transmitted through and emitted from the optical lens 1 into substantially a circular form.

Though the small-sized optical lens 1 used in an optical pickup of a CD-ROM drive or the like is explained above, without being restricted thereto, the optical lens in accordance with the present invention may be used for other purposes as well.

Second Embodiment

In the following, the optical lens in accordance with the second embodiment will be explained.

Figure 3:
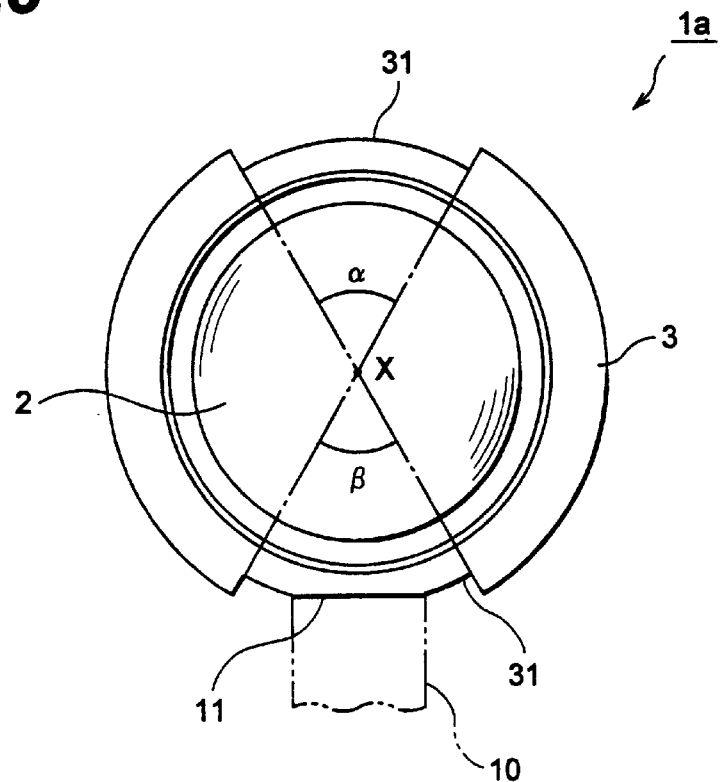
FIG. 3 is an explanatory view of the optical lens in accordance with a second embodiment.
Figure 4:
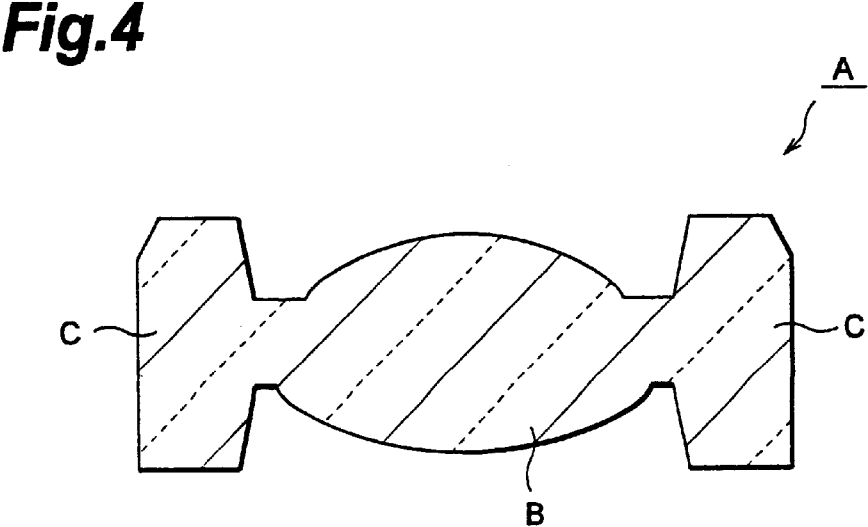
FIG. 4 is an explanatory view of a conventional optical lens.
Figure 5:
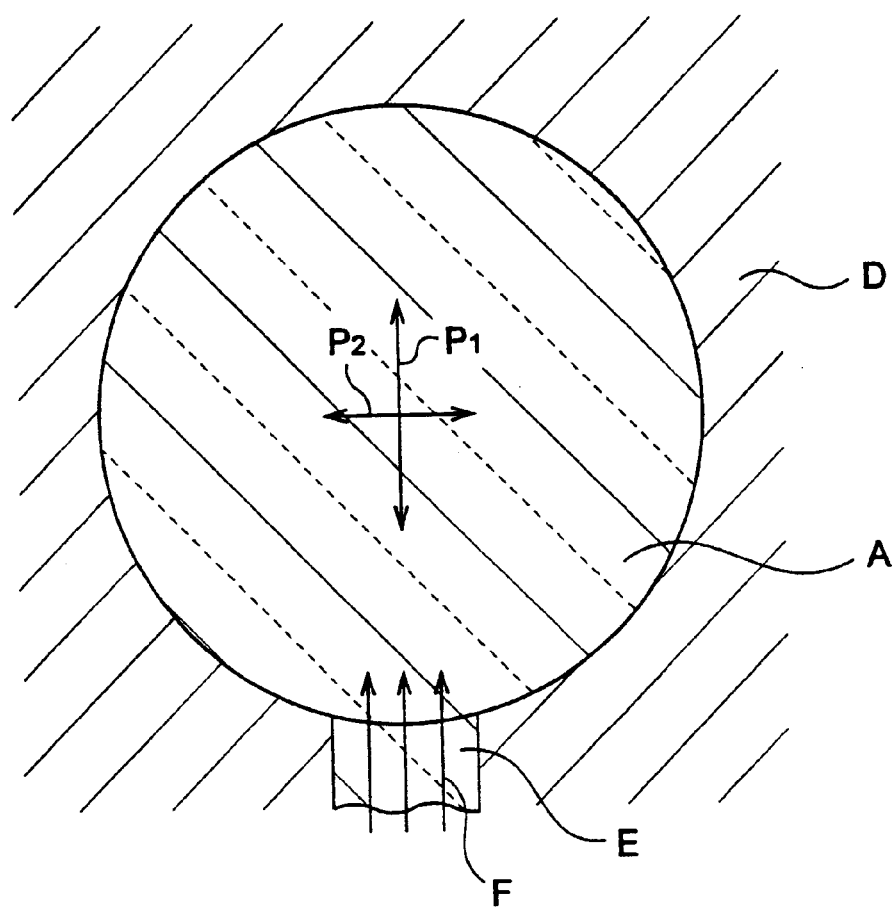
FIG. 5 is an explanatory view of the conventional optical lens.

FIG. 3 shows an optical lens in accordance with this embodiment. In FIG. 3, an optical lens 1a has substantially the same form as the optical lens 1 of the first embodiment but differs therefrom in that the position of the gate 10 upon manufacture is located in the area formed with a smaller-diameter section 31. In the optical lens 1a, upon molding, the holding pressure would be applied greater in the gate direction (longitudinal direction in FIG. 3) connecting the smaller-diameter sections 31, 31 and smaller in the gate-perpendicular direction (lateral direction in FIG. 3). As a consequence, the amount of distortion within the optical lens 1a becomes greater in the gate direction than in the gate-perpendicular direction, whereby astigmatism would be generated in the optical lens 1a due to such a difference in the inner distortion. Further, as the resin shrinks upon cooling, in the optical lens 1a, the amount of shrinkage is greater in the gate-perpendicular direction than in the gate direction. Consequently, in addition to the astigmatism caused by inner distortion, astigmatism occurs due to changes in the form, thereby increasing the overall astigmatism in the optical lens 1a. This configuration is useful in the case where, as mentioned above, astigmatism is positively generated in order to enhance characteristics of an optical system incorporating such an optical lens.

As explained above, in the optical lens 1a in accordance with this embodiment, as with the optical lens 1 in accordance with the above-mentioned first embodiment, since the smaller-diameter sections 31, 31 are formed at symmetrical positions in the flange 3, the difference in amount of shrinkage between the gate direction connecting the smaller-diameter sections 31, 31 and the gate-perpendicular direction orthogonal thereto can be utilized to generate astigmatism in the optical lens 1a upon molding thereof. As the area formed with the smaller-diameter sections 31, their diameter, or the like is appropriately set, the resulting astigmatism of the optical lens 1a can be arbitrarily increased or decreased. Also, characteristics of an optical system incorporating the optical lens 1a can be enhanced by arbitrarily generating astigmatism. For example, in the case where light incident on the optical lens 1a has an elliptical luminous flux cross section, the smaller-diameter sections 31, 31 can be effective in generating astigmatism in the optical lens 1a such as to change the luminous flux cross section of the light transmitted through and emitted from the optical lens 1a into substantially a circular form.

Third Embodiment

In the following, an optical lens in accordance with the third embodiment will be explained.

Though the optical lenses 1, 1a in accordance with the first and second embodiments are such that the smaller-diameter section 31 formed in the flange 3 is recessed like a step with respect to the other part of the flange 3, the present invention should not be restricted thereto. For example, the boundary between the smaller-diameter section 31 and the other part may smoothly continue to each other. Such an optical lens can also yield effects similar to those of the optical lenses 1, 1a in accordance with the above-mentioned first and second embodiments.

Also, the outer periphery of the smaller-diameter section 31 in the optical lens may not necessarily have an identical radius of curvature about the optical axis X. For example, the radius of curvature of the center portion in the smaller-diameter section 31 may differ from that of end portions thereof. Such an optical lens can also yield effects similar to those of the optical lenses 1, 1a in accordance with the above-mentioned first and second embodiments.

As explained in the foregoing, the present invention can yield the following effects.

As smaller-diameter sections are formed at symmetrical positions in the flange, the amount of shrinkage upon molding of the optical lens would differ between the direction connecting the smaller-diameter sections and the direction orthogonal thereto. This direction-dependent difference in amount of shrinkage can be utilized to generate astigmatism. As the area formed with the smaller-diameter sections, their diameter, or the like is appropriately adjusted, the amount of astigmatism in the optical lens can be suitably regulated. Accordingly, in the case where astigmatism is generated in the optical lens due to its inner distortion, the smaller-diameter sections can be formed so as to negate this astigmatism, whereby the overall astigmatism of the optical lens can be reduced.

Also, when light incident on the optical lens has an elliptical luminous flux cross section, the smaller-diameter sections can be formed to provide the optical lens with astigmatism such as to change the luminous flux cross section of the light into substantially a circular form. From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical lens comprising:
   an optically functioning portion having an optical axis;
   a flange located at an outer periphery of said optically functioning portion; and
   a gate cut section located at an outer periphery of said flange, wherein said flange has diametrically opposed first and second sections, the first section being located at the gate cut section, and diametrically opposed third and fourth sections orthogonally arranged with respect to the first and second sections, the first and second sections having an outer diameter different from an outer diameter of the third and fourth sections, wherein the first, second, third and fourth sections are arranged to adjust the astigmatism of the optically functioning portion.

2. The optical lens according to claim 1, wherein said optical lens is manufactured by injection molding of a resin at the gate cut section.

3. The optical lens according to claim 2, wherein the outer diameter of the first and second sections is larger than the outer diameter of the third and fourth sections.

4. The optical lens according to claim 2, wherein the outer diameter of the first and second sections is smaller than the outer diameter of the third and fourth sections.

5. The optical lens according to claim 1, wherein each of the first, second, third, and fourth sections has a circular arcuate configuration with the optical axis as a center.

* * * * *